United States Patent [19]

Crook

[11] Patent Number: 5,669,572

[45] Date of Patent: Sep. 23, 1997

[54] ANTI-CINCH AUTOMATIC LOCKING RETRACTOR WITH CAM RELEASE

[75] Inventor: James E. Crook, Carmel, Ind.

[73] Assignee: Indiana Mills and Manufacturing, Inc., Westfield, Ind.

[21] Appl. No.: 573,411

[22] Filed: Dec. 15, 1995

Related U.S. Application Data

[63] Continuation-in-part of Ser. No. 307,528, Sep. 16, 1994, Pat. No. 5,497,956.

[51] Int. Cl.$^6$ .................................................. B60R 22/353
[52] U.S. Cl. ........................................................ 242/382.1
[58] Field of Search ............................. 242/382.1, 382.2, 242/382.3, 382.4

[56] References Cited

U.S. PATENT DOCUMENTS

| | | |
|---|---|---|
| 3,412,952 | 11/1968 | Wohlert et al. ............ 242/382.1 |
| 3,604,654 | 9/1971 | Stoffel ............................ 242/382.1 |
| 3,667,698 | 6/1972 | Fisher ............................ 242/382.1 |
| 3,741,495 | 6/1973 | Takada ............................ 242/382.1 |
| 3,794,266 | 2/1974 | Schwartz ........................ 242/382.1 |
| 3,944,163 | 3/1976 | Hayashi et al. ................ 242/382.1 |
| 3,945,586 | 3/1976 | Higbee et al. . | 
| 4,171,782 | 10/1979 | Rumpf .......................... 242/382.1 |
| 4,541,580 | 9/1985 | Ono ............................... 242/382.1 |
| 4,611,770 | 9/1986 | Cotter . | |
| 4,911,377 | 3/1990 | Lortz et al. . | |

FOREIGN PATENT DOCUMENTS

| | | | |
|---|---|---|---|
| 3022756 | 3/1982 | Germany | 242/382.1 |

*Primary Examiner*—John M. Jillions
*Attorney, Agent, or Firm*—Woodard, Emhardt, Naughton, Moriarty & McNett

[57] ABSTRACT

An anti-cinch automatic locking retractor. A web spool is rotatably mounted between a pair of upstanding walls. The spool includes a pair of flanges each having a plurality of locking teeth with the teeth spaced apart by an included angle. A pawl is pivotally mounted to the walls and is lockingly engagable with the teeth. A cam plate mounted adjacent the spool and rotatable therewith includes a cam surface extending through an angle greater than the teeth included angle to limit cinching of the web spool as the spool rotates to and from the locking position and through the included angle. A cam release rotatably mounted to the upstanding walls limits movement of the cam plate.

19 Claims, 7 Drawing Sheets

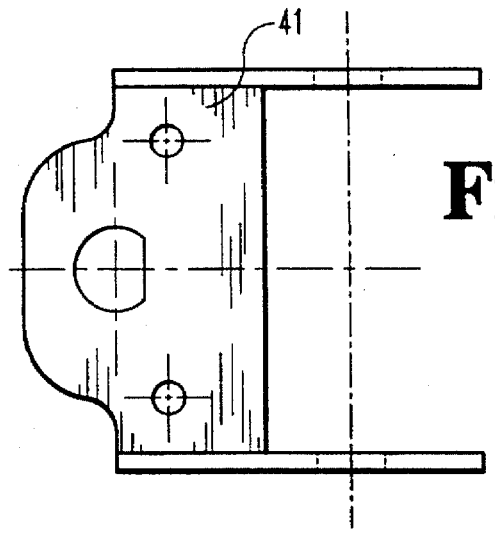
Fig. 5
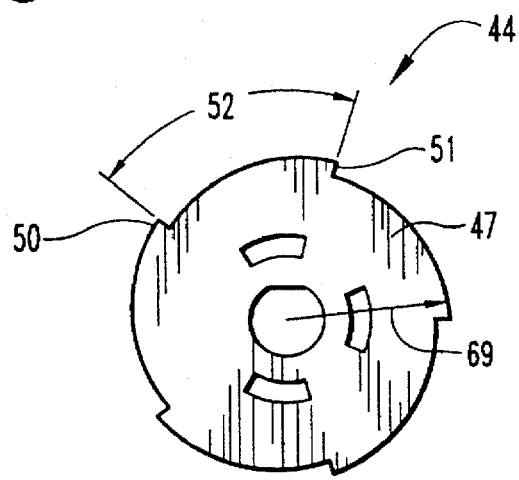
Fig. 6
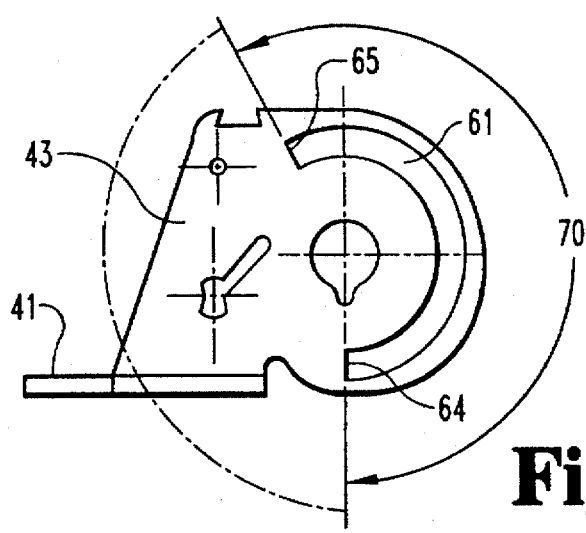
Fig. 4
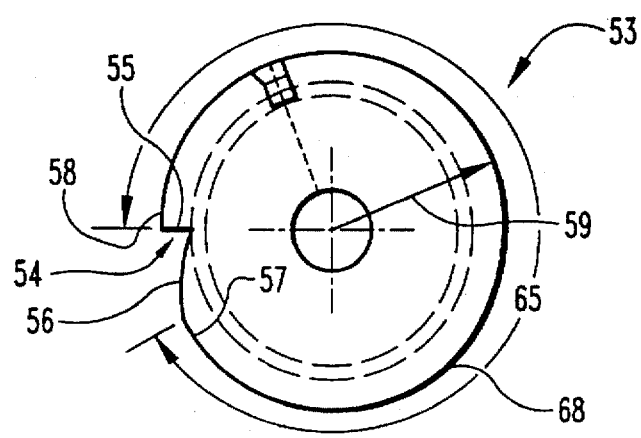
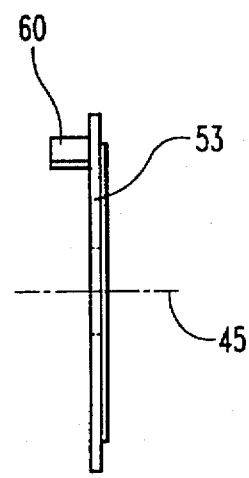
Fig. 7          Fig. 8

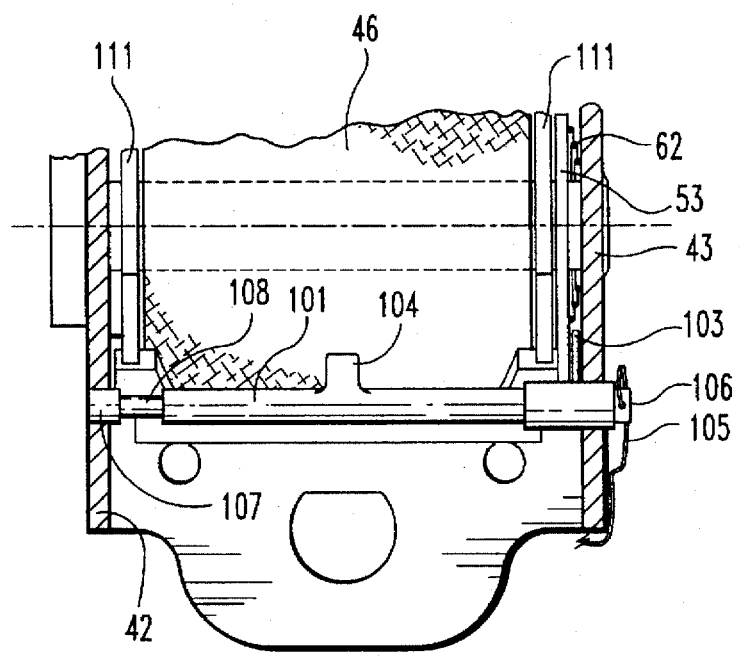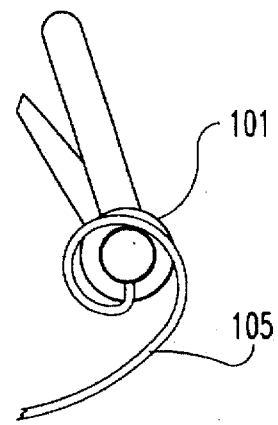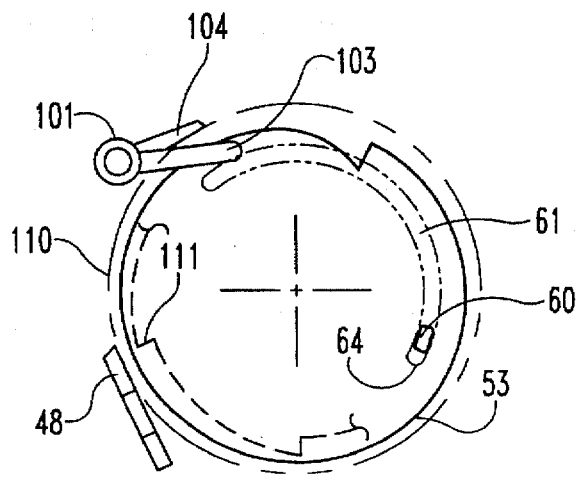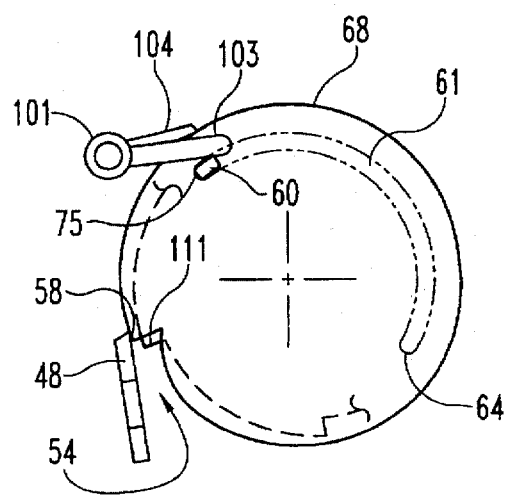
Fig. 10
Fig. 11
Fig. 12
Fig. 13

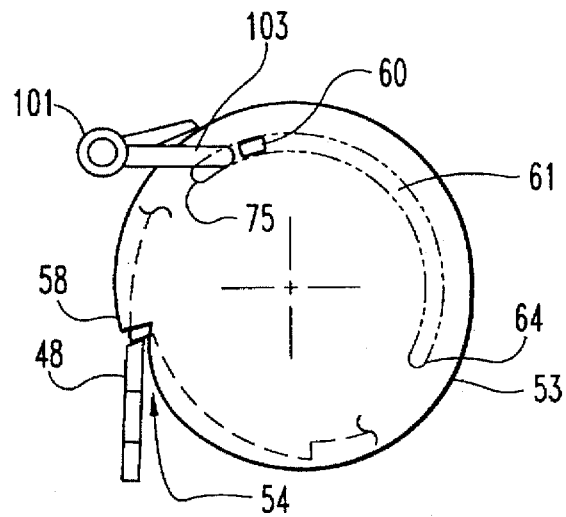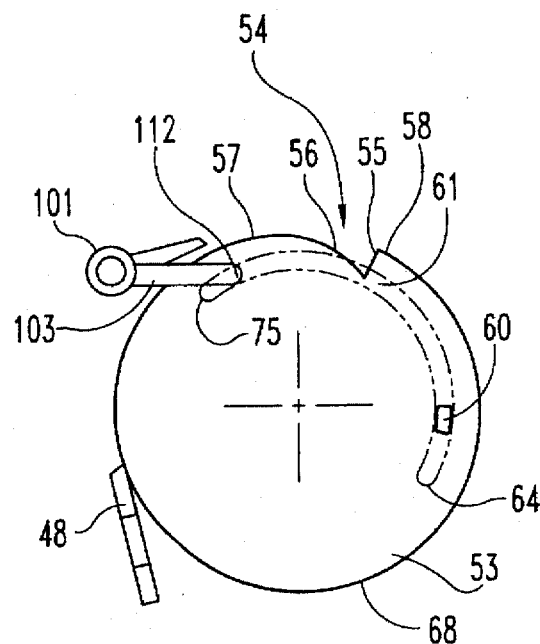
Fig. 14  Fig. 15
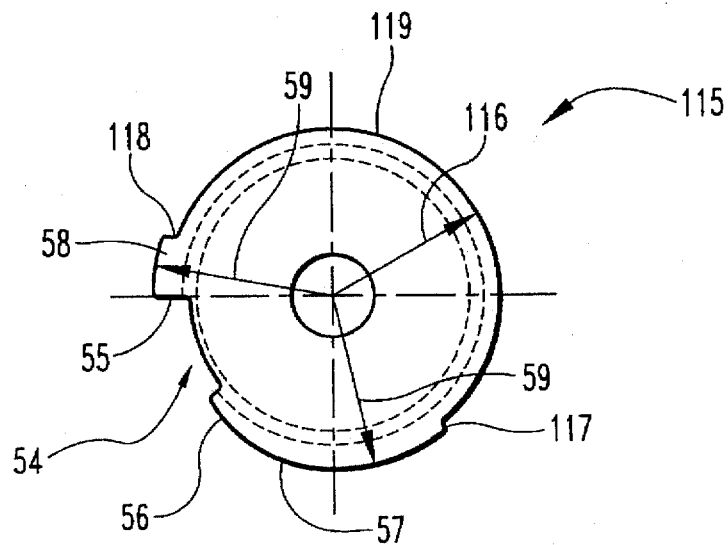
Fig. 16

ANTI-CINCH AUTOMATIC LOCKING RETRACTOR WITH CAM RELEASE

CROSS-REFERENCE TO RELATED APPLICATION

This application is a continuation-in-part of my U.S. patent application Ser. No. 08/307,528, filed Sep. 16, 1994, now U.S. Pat. No. 5,497,956 and entitled "Anti-Cinch Automatic Locking Retractor."

BACKGROUND OF THE INVENTION

1. Field of the Invention

This invention is in the field of retractors for use with webs.

2. Description of the Prior Art

The prior automatic locking retractor has a spring biased spool rotatably mounted to a bracket with a web extendable or retractable as the spool is wound. An elongated pawl is pivotally mounted to the bracket and is positioned to engage and lock with the ratchet shaped end flanges of the spool. The pawl is held apart from the flanges until the web is extended to the desired position and then slightly retracted. Thus, the retractor is automatically locked preventing further web extension once the web is pulled outwardly to the desired position and slightly released.

Two main types of automatic locking retractors have been provided for automatically locking the web once pulled outwardly to the desired position. Retractor 11 (FIG. 1) includes a bracket or frame 12 with a pair of spaced apart walls 13 between which is rotatably mounted the spool having web 14 wound thereon. A tongue or lock 15 is mounted to the distal end of the web. Gear 19 rotates with the spool and drives an intermediate gear 20 in meshing engagement with an internal tooth gear 16 rotatably mounted to frame 12. An outward projecting cam 17 fixedly mounted to gear 16 is movable against pawl 18 pivotally mounted between the pair of spaced apart walls 13 and positioned to lockingly engage the opposite ratchet shaped walls of the spool. Such a/ retractor is shown in the U.S. Pat. No. 3,945,586.

A second type of automatic locking retractor is shown in FIG. 2 and includes a frame 20 between which is a rotatably mounted spool 21 having web 22 mounted thereon. Spring 23 is mounted to frame 20 and enclosed within cap 24 and rotatably drives spool 21 to the retracted position. Spool 21 is mounted to the opposite walls of bracket 20 by pin 25. Likewise, pawl 26 is mounted to bracket 20 and is positioned to lockingly engage the teeth 27 of spool 21. A cam plate 28 is mounted to pin 25 between spool wall 29 and wall 38 and is urged against wall 29 by means of a spring. Cam plate 28 has constant diameter except at the location of projection 30 and 31 separated apart by notch 32. The diameter of cam plate 28 is less than the diameter of wall 29 except at the location of projections 30 and 31 and notch 32 thereby ensuring that the teeth of wall 29 project outwardly of cam plate 28. The initial withdrawal of the retractor, that is, outward extension of the web, causes cam plate 28 to rotate positioning projection 30 adjacent pawl 26 and preventing the pawl from pivoting inwardly to engage the spool teeth. Once the web is slightly retracted from the fully extended position, cam plate 28 moves in a clockwise direction as viewed in FIG. 2 positioning notch 32 adjacent pawl 26 and allowing the pawl to pivot inwardly lockingly engaging the spool teeth. Further extension of the web is therefore prevented. Retraction of the web causes clockwise rotation of cam plate 28 positioning projection 31 adjacent the pawl thereby spacing the pawl apart from the teeth and allowing the spool to freely retract without the noise associated with the teeth contacting the pawl. If, however, the web is again extended before fully retracted, cam plate 28 will rotate in a counterclockwise direction as viewed in FIG. 2 causing the pawl to fall into notch 32 preventing further extension of the web.

A problem with the previously described prior automatic locking retractors is that web will continually become tighter or cinch if the web is repeatedly retracted and extended in small amounts. Such cinching may occur if the vehicle seat moves with respect to the retractor. For example, trucks are typically driven over rough terrain resulting in extensive vertical movement of the occupant seat. Thus, once the seat belt harness or web is locked in place and the seat moves downwardly toward the vehicle floor, webbing will be slightly withdrawn into the retractor allowing one or more of the teeth of the spool to move past the pawl. Once the seat moves upwardly, force will be applied to the web to pull the web outwardly; however, at this time projection 31 will move apart from the pawl thereby locking the pawl within notch 32 resulting in tightening of the web. Several or even one such unplanned tightening is uncomfortable to the occupant.

In order to circumvent this problem, the commonly owned U.S. Pat. No. 4,911,377 discloses an anti-cinch locking retractor having a floating cradle upon which the pawl is mounted to allow limited web extension and retraction. Other approaches include the retractors disclosed in U.S. Pat. Nos. 3,412,952, 3,667,698, 3,944,163 and 4,611, 770 and German Patent 3,022,756. The aforementioned U.S. Pat. No. 3,944,163 discloses in FIG. 22 an arcuate flange slot for controlling movement of the cam through an angle of approximately 180° allowing the cam plate to temporarily unlock the pawl and locking wheel to allow rotation of the locking wheel or spool in protracting direction over a predetermined number of teeth. Disclosed herein is a different solution and approach to the cinching problem.

The prior art retractors include a cam plate having a notch formed therein to allow the pawl to lockingly engage the spool ratchet teeth. The cam includes an upraised cam surface forming an initial contact area immediately adjacent the notch which contacts and holds the pawl outwardly away from the spool ratchet teeth as the web is initially extended from the retractor thereby keeping the pawl away from the ratchet teeth as the web is unwound. Once the web is extended and then slightly retracted to the web extended position, the cam will have rotated thereby moving the initial contact area apart from the pawl and positioning the cam notch adjacent the pawl allowing the pawl to lockingly engage the spool ratchet teeth. Further web extension is thereby prevented. As the web is then retracted in my retractor of FIG. 3 herein, the spool and cam plate will rotate forcing the pawl apart from the spool teeth. Web extension subsequent to the web retraction will be permitted in the FIG. 3 retractor as the cam plate rotates with the web spool sufficiently until the pawl drops back into the cam plate notch and once again engages the spool ratchet teeth. There is therefore no need once the pawl has engaged the spool ratchet teeth for the cam to rotate to locate the initial contact area of the cam adjacent the pawl. I have therefore provided and disclosed herein a cam release movable toward the cam blocking movement of the initial contact area against the pawl once the web is at maximum extension and then slightly retracted to the web extended position, thereby allowing the pawl to lockingly engage the spool ratchet teeth limiting web extension. No device to accomplish such performance is known.

SUMMARY OF THE INVENTION

One embodiment of the present invention is a web retractor comprising a retractor frame with a pair of upstanding walls. A web spool is rotatably mounted about an axis of rotation to the pair of upstanding walls and is movable to and between a web retracted position and a web extended position. The spool includes at least one spool end wall with teeth formed circumferentially thereon. A lock is movably mounted to the frame and is lockingly engagable with the teeth. A first device is movably mounted on the frame and is movable between a first position whereat the lock and teeth are locked together when the spool is at the web extended position and a second position blocking locking of the lock with the teeth as the lock moves to the web extended position. A second device is mounted on the frame and is movable between a third position and a fourth position with the second device when in the third position blocking movement of the first device to the second position and when in the fourth position allowing movement of the first device to the first position.

It is an object of the present invention to provide an automatic locking retractor preventing web cinching.

Another object of the present invention is to provide a new and improved web retractor.

Yet a further object of the present invention is to provide a new and improved anti-cinch automatic locking retractor.

A further object of the present invention is to provide an anti-cinch automatic locking retractor with cam release.

Related objects and advantages of the present invention will be apparent from the following description.

BRIEF DESCRIPTION OF THE DRAWINGS

FIG. 4 is a side view of the retractor frame of FIG. 3.

FIG. 5 is a top view of the frame of FIG. 4.

FIG. 6 is a side view of the web spool.

FIG. 7 is a side view of the cam plate.

FIG. 8 is an end view of the cam plate of FIG. 7.

FIG. 10 is a fragmentary top view of the retractor of FIG. 9.

FIG. 11 is a right side view of the release cam shown on the retractor of FIG. 10.

FIG. 12 is an operational diagram illustrating the FIG. 10 retractor in a web retracted position.

FIG. 13 is an operational diagram illustrating the FIG. 10 retractor with the web being in a maximum extended position.

FIG. 14 is an operational diagram of the FIG. 10 retractor with the web being slightly retracted from the FIG. 13 position and the retractor in a locked condition.

FIG. 15 is an operational diagram of the FIG. 10 retractor with further web retracted from the position of FIG. 14 with the retractor remaining in the locked condition.

FIG. 16 is a side view of an alternate embodiment of the cam plate.

DESCRIPTION OF THE PREFERRED EMBODIMENTS

Figure 1:
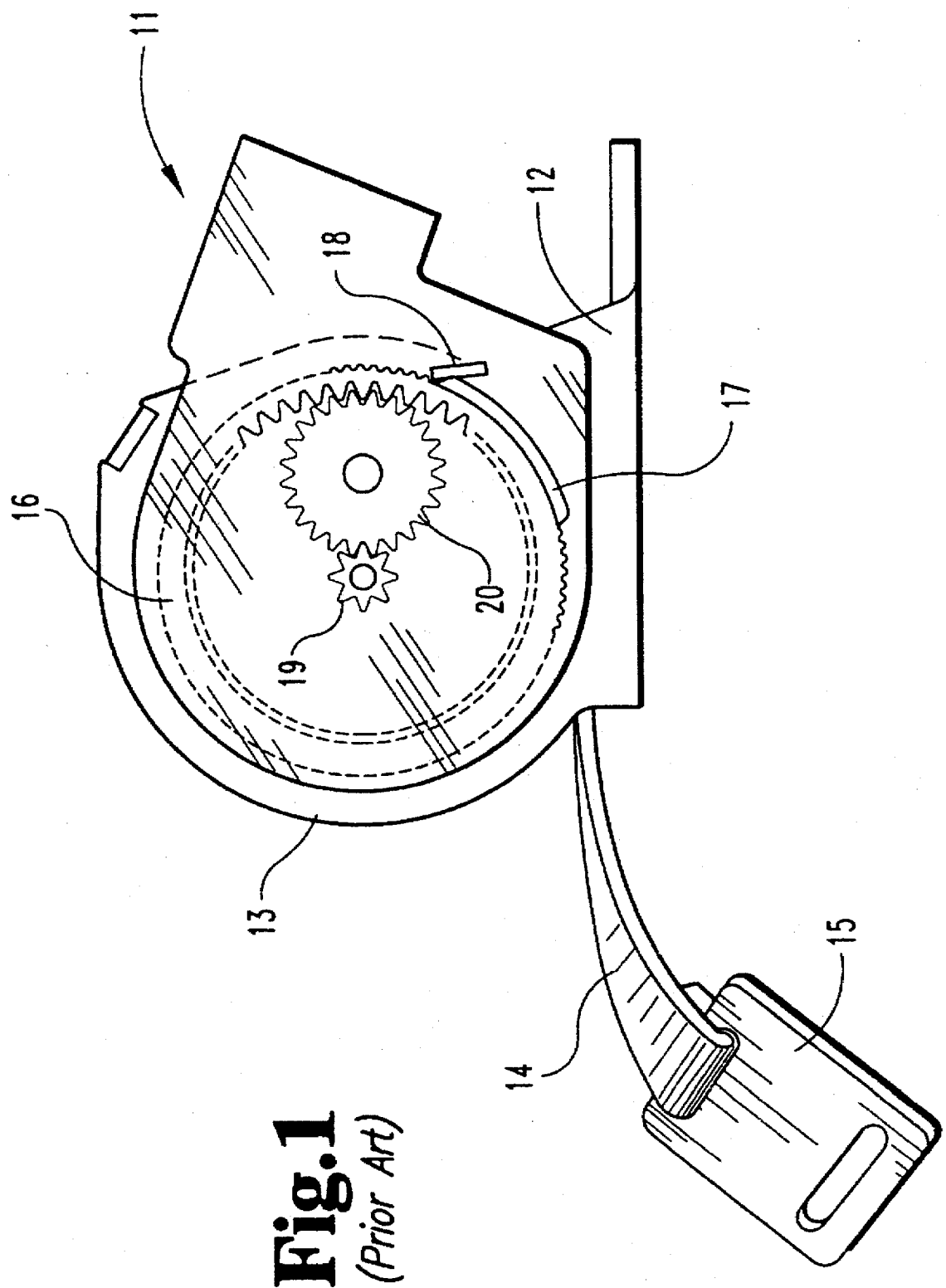
FIG. 1 is a side view of a prior art automatic locking retractor.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
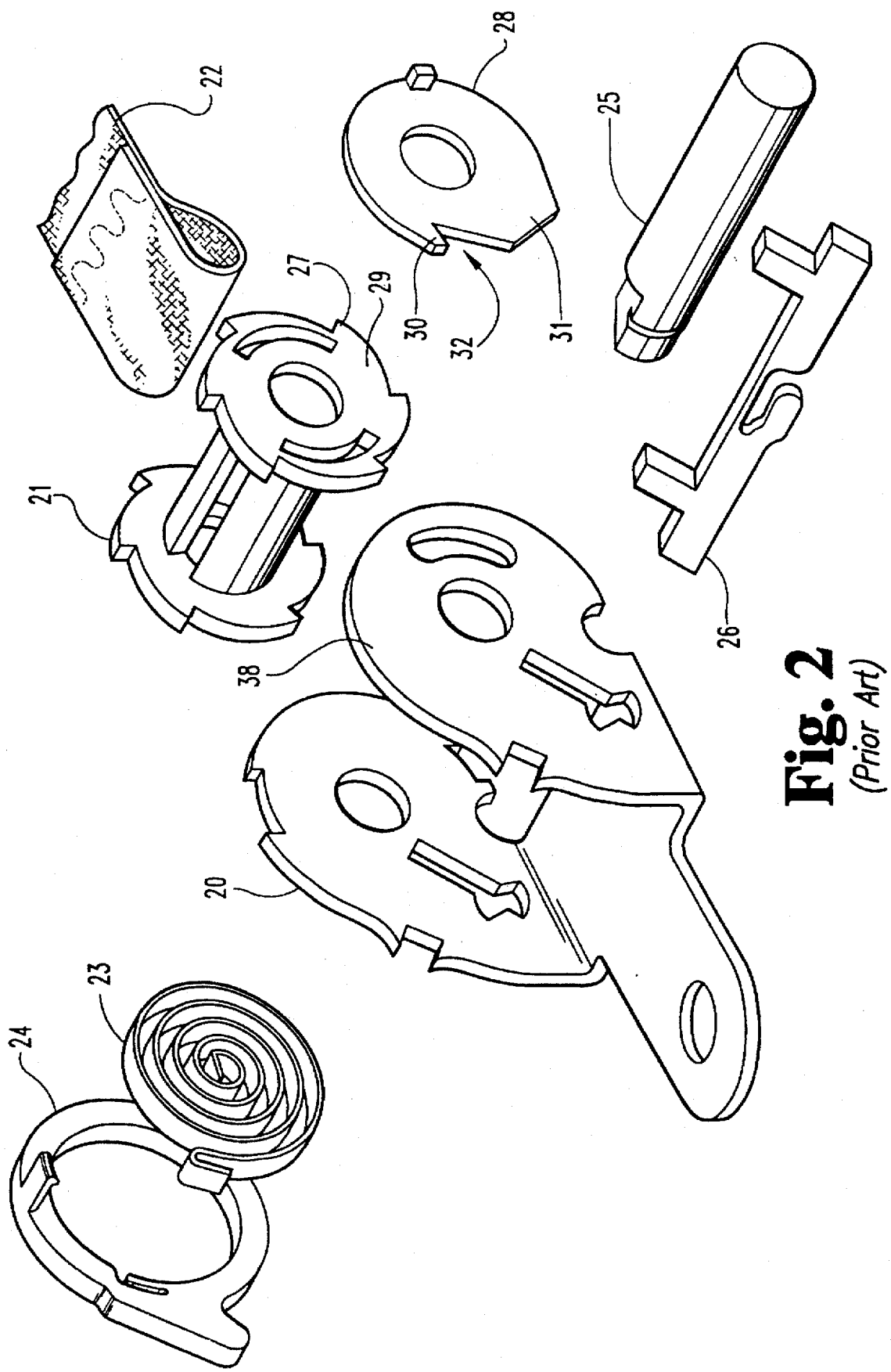
FIG. 2 is a perspective exploded view of another prior art automatic locking retractor.
Figure 3:
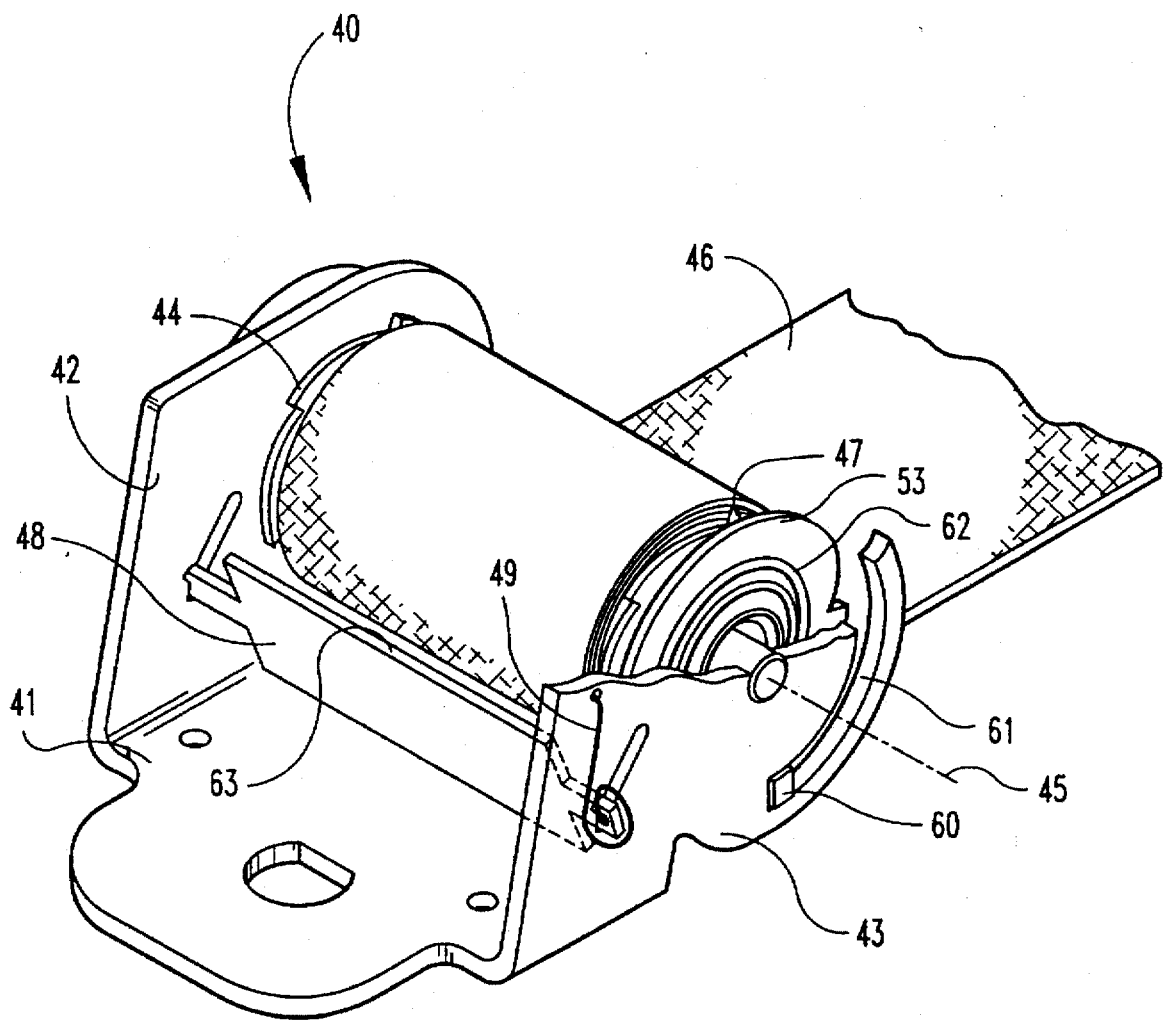
FIG. 3 is a perspective fragmentary view of the anti-cinch automatic locking retractor incorporating an alternate embodiment of the present invention.

Referring now more particularly to FIG. 3, there is shown the alternate embodiment of the anti-cinch locking retractor 40 incorporating the present invention. Retractor 40 includes a frame 41 with a pair of upstanding walls 42 and 43, the later of which is shown fragmented to more clearly illustrate the cam plate. Frame 41 is adapted to be fixedly secured to the vehicle frame and includes a web spool 44 rotatably mounted about a longitudinal axis 45 extending through walls 42 and 43. Spool 44 includes a pair of end flanges 47 having a plurality of locking teeth positioned thereon. A spring 23 (FIG. 2) mounted to wall 42 is engaged with wall 42 and the spool and is operable to urge the spool to rotate in a clockwise direction as viewed in FIG. 3 to retract the web to a web retracted position. The spring is yieldable to allow the spool to rotate in a counterclockwise direction so that the web may be pulled to a maximum extended position. A pawl 48 is pivotally mounted in a pair of slots provided in walls 42 and 43 and is urged by wire spring 49 into locking engagement with the teeth formed on flanges 47 to limit the rotation of the spool in a counterclockwise direction once the web is pulled outwardly to the maximum extended position and then retracted slightly to the locking position. Retractor 40 may be identical to the retractor shown in FIG. 2 with exception of the design of the cam plate and the associated slot provided in wall 43.

Spool 44 is rotatably mounted on longitudinal axis 45 and is identical to spool 21 and with the exception that the spool of FIG. 2 is shown as having six teeth located on each end flange whereas the preferred embodiment of spool 44 has five locking teeth on each end flange. The number of teeth on each flange may be varied although the number of teeth on one end flange must be identical to the number of teeth on the opposite end flange. The teeth are positioned around the circumference of each end flange and are positioned apart by an included angle. For example, teeth 50 and 51 (FIG. 6) on end flange 47 are positioned apart by a first included angle 52. Since there are five teeth on end flange 47, included angle 52 is equal to 72°.

Cam plate 53 (FIG. 7) is rotatably mounted to frame 41 about the rotational axis 45. Cam plate 53 has a constant diameter except at indented portion 54 forming a locking surface 55 located on a line intersecting longitudinal axis 45 and intersecting a sloping surface 56 extending outwardly to area 57 where it intersects the outside diameter of the cam plate. Likewise, locking surface 55 extends outwardly to area 58 intersecting the outside diameter of the cam plate. The circumferentially extending surface 68 located between and contiguous with areas 57 and 58 is located a constant radial distance 59 from axis 45. Areas 57 and 58 are located equidistant from axis 45. An ear 60 integral with the cam plate extends perpendicularly outwardly therefrom and into arcuate slot 61 (FIG. 4) provided on end wall 43 of frame 41. Cam plate 53 is mounted adjacent spool flange 47 and is located between flange 47 and wall 43. Spring 62 (FIG. 3) located between cam plate 53 (FIG. 3) and wall 43 urges the cam plate against spool flange 47 to rotate therewith but is yieldable to allow relative motion between the cam plate and flange when ear 60 contacts either end of arcuate slot 61. Cam plate 53 is positioned relative to the spool so that locking surface 55 can contact edge 63 of pawl 48 as the spool is rotated in a counterclockwise direction as viewed in FIG. 3.

The circumferentially extending surface 68 (FIG. 7) has a constant radius 59 between areas 57 and 58 and forms a cam surface which extends from area 58 in a clockwise direction to area 57 as viewed in FIG. 7 through a second angle 65. Angle 65 is greater than the first included angle 52 (FIG. 6) extending between at least a pair of adjacent teeth 50 and 51. Radius 59 (FIG. 7) is greater than the maximum radius 69 (FIG. 6) extending to the most outer portion of the teeth thereby positioning surface 68 radially outward of the spool ratchet teeth with surface 68 contacting pawl 48 to limit cinching as the spool rotates to and from the locking position.

Slot 61 in wall 43 (FIG. 4) extends from slot end 64 to slot end 75 through a fourth included angle 70 which is greater than the angle 52 (FIG. 6) between adjacent teeth. In one embodiment, angle 70 is 210°. In the same embodiment, angle 65 is 330°. In the same embodiment, angle 52 is 72°. Best results are obtained when angle 70 is within a range of 90° and 300°. In the embodiment shown in the drawings, angle 70 is at least 180°.

With the web on the spool fully retracted, the web is wrapped on the spool sufficiently so that the web contacts the pawl forcing the pawl outwardly from the spool teeth. As the web is withdrawn from the web retracted position, the diameter of the web existing on the spool will decrease sufficiently to be spaced apart from the pawl. Simultaneously with the web being withdrawn to a maximum web extended position, cam plate 53 will rotate with the spool in a counterclockwise direction as viewed in FIG. 3 until ear 60 moves from end 64 of slot 61 to end 75 of the slot. Once the ear is positioned adjacent slot end 75, area 58 (FIG. 7) is positioned immediately beneath and against the pawl holding the pawl outwardly apart from the spool teeth. Area 58 thereby forms a lobe area or contact surface extending only a slight distance from locking surface 55 but a sufficient distance to allow the cam plate to hold the pawl outwardly from the spool teeth. Once the tongue mounted to the distal end of the web is locked to a mating buckle and the web is slightly retracted, cam plate 53 will rotate with the spool in a clockwise direction as viewed in FIG. 3 as the web is being slightly retracted. Cam plate area 58 will therefore rotate apart from the pawl allowing the pawl to drop into indented portion 54 contacting locking surface 55 and preventing the retractor from further rotation in a counterclockwise direction and preventing further web extension. In the event tension on the distal end of the web is reduced to provide slack in the web, the spool is operable to retract web into the retractor. Such action will occur in the event the seat is forced downwardly toward the retractor as experienced in a rough ride. Clockwise rotation of the spool through a third angle as the spool winds up the web will cause clockwise rotation of cam plate 53 as viewed in FIG. 3 allowing the pawl to ride outwardly on surface 56 and onto area 57 thereby positioning the pawl apart from the spool teeth. Area 57 provides a lobe area or contact located immediately adjacent the outwardly slopping surface 56. The circumferential length of area 57 must be sufficient to contact and hold the pawl apart from the spool teeth. Continued retraction of the web with the spool and cam plate rotating in a clockwise direction as viewed in FIG. 3 positions cam surface 68 in contact with and adjacent the pawl eventually positioning ear 60 adjacent slot end 64. Once the ear contacts slot end 64 and if the web is then pulled outwardly the cam plate will reverse rotation with the spool until eventually the pawl is once again located in notch 54 locking the pawl to the tooth previously engaged and positioning the web in the exact same position prior to the release of tension on the web and the retraction of the web resulting in web movement without cinching. On the other hand, once cam plate 53 has rotated sufficiently to position cam surface 68 against pawl 48 and with ear 60 located adjacent slot end 64, continued retraction of the web will result in cam plate 53 slipping relative to spool flange 47 so that when the web is then extended positioning the pawl in notch 54, the spool will not be returned to its original position resulting in cinching or tightening of the web from its original position. Thus, slot 61 along with cam ear 60 provide a web travel limit means which limits web travel once pawl 48 is in locking engagement with the web spool and the web moves from the locking position toward the web retracted position and then back toward the locking position thereby allowing the pawl to drop once again into notch 54. The slot and ear limit web extension when the spool is in the locking position and also limit web retraction without cinching once the spool is in the locking position. That is, when the spool is locked, web may not be extended whereas a limited amount of web may be retracted without cinching.

Figure 9:
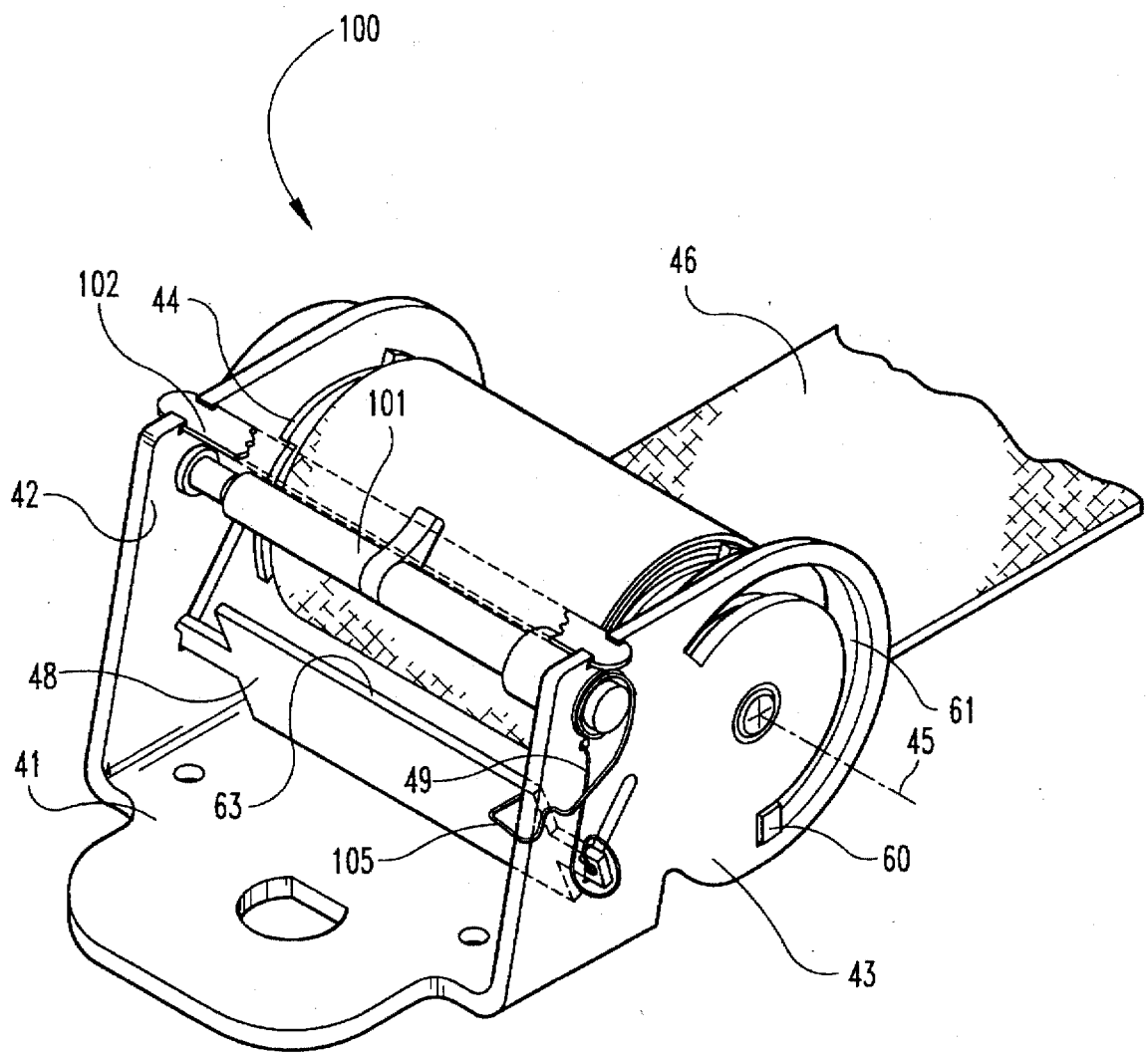
FIG. 9 is a perspective fragmentary view of the anti-cinch automatic locking retractor incorporating the preferred embodiment of the present invention and including the cam release.

The alternate embodiment of the anti-cinch automatic locking retractor is illustrated in FIG. 9. Retractor 100 is identical to the retractor 40 illustrated in FIG. 3 with exception of the addition of cam release 101. Thus, retractor 100 includes a frame 41 with the upstanding walls 42 and 43 rotatably receiving the spool having web 46 wrapped thereon. A spring at one end of the spool normally urges the web to be retracted but is yieldable to allow the web to be pulled outwardly therefrom. The opposite ends of the spool 44 include ratchet teeth formed thereon to lockingly engage pawl 48 pivotally mounted to the frame and urged by spring 49 so that edge. 63 lockingly engages the ratchet teeth. The cam plate is not shown in FIG. 9 but is as previously described and illustrated and includes an ear 60 slidable along the length of an arcuate slot 61. A cross brace 102 extends between and is affixed to the upstanding walls 42 and 43 of the frame.

Cam release 101 has an elongated rod shaped main body with the opposite ends rotatably mounted to walls 42 and 43. A pair of legs or projections 103 and 104 are integrally formed on and extend from cam release 101. Leg 103 extends between wall 43 and cam plate 53 and is movable to engage ear 60 to limit movement of the cam plate. Leg 104 is extendable toward the web 46 on the spool and will engage the web wrapped on the spool when the web is fully wrapped thereon thereby pivoting the cam release in such a manner so that leg 103 is positioned apart from ear 60. A spring 105 is attached to and extends between end 106 of the cam release and frame 41 and normally urges the cam release in a clockwise direction as viewed in FIG. 11 thereby moving leg 103 toward ear 60. Spring 105 is yieldable to allow the cam release to pivot in a counterclockwise direction as viewed in FIG. 11 whenever the web is completely retracted on the spool and leg 104 engages the web thereby rotating the cam release locating leg 103 apart from ear 60.

Cam 101 is constructed to enable the cam release to be installed to walls 42 and 43. Numerous techniques may be employed. For example, end 107 is sized to rotatably fit in an hole formed in wall 42. The diameter of the cam release is reduced at location 108 immediately adjacent wall 42 to enable the main body of the cam release to be moved to the left as viewed in FIG. 10 until end 106 is located between walls 42 and 43 with the cam release then being moved to the right to insert end 106 through wall 43 with wire spring 105 then being mounted to end 106 and wall 43.

FIG. 12 illustrates the FIG. 9 retractor with the web completely wrapped on the spool. That is, the spool is in the web retracted position. Thus, ear 60 is located adjacent end 64 of slot 61 with the web diameter 110 contacting pawl 48 thereby positioning the pawl apart from cam plate 53 and ratchet teeth 111. Simultaneously, leg 104 of cam release 101 is in contact with web diameter 110 positioning leg 103 apart from ear 60 and away from slot 61. The retractor is therefore unlocked and the web may freely be withdrawn.

In order to couple the tongue or buckle attached to web 46 with the mating buckle or tongue, belt 46 is grasped and pulled outwardly to a maximum extended position to enable the web to extend over the occupant and enable coupling of the mating buckle and tongue. Such a maximum web extended position is illustrated in FIG. 13. Web diameter 110 is therefore considerably reduced and is not visible in the diagram of FIG. 13 since the web diameter is less than the diameter of the cam plate and the diameter of the spool flanges having the ratchet teeth formed thereon. With the web in the maximum extended position, ear 60 has moved in slot 61 from end 64 to end 75 as explained for the embodiment of FIG. 3. Cam plate 53 is identical to the cam plate described for the embodiment of FIG. 3 and includes a notch or indented portion 54 formed in the circumferentially extending surface 68. A first contact area 58 is provided on surface 68 immediately adjacent notch 54 with surface 58 contacting pawl 48 and holding the pawl apart from the ratchet teeth 111 whenever ear 60 is located at end 75 of slot 61. End 75 of slot 61 is located on frame wall 43 to allow the initial contact area 58 of the cam plate to contact pawl 48 when the follower is located at end 75. Simultaneously, leg 104 no longer contacts the web diameter which has decreased allowing spring 105 to cause rotation of the cam release positioning leg 103 atop and adjacent ear 60.

Once the buckle and tongue are coupled and pressure is released on the web, the spool will rotate slightly thereby moving cam plate 53 in a clockwise direction as viewed in FIG. 13 so that contact area 58 is no longer in contact with pawl 48 and allowing pawl 48 to drop into notch 54 as illustrated in FIG. 14. Thus, pawl 48 will lockingly engage teeth 111 formed in the flanges of the web spool. The retractor is therefore in a locked condition. Simultaneously, ear 60 moves apart from slot end 75 allowing spring 105 to further rotate cam release 101 positioning leg 103 adjacent slot 61 and blocking movement of ear 60 to end 75.

As previously described, cam 53 includes a notch 54 (FIG. 15) formed between areas 57 and 58. Since leg 103 is positioned adjacent slot 61 thereby blocking movement of ear 60 to end 75, the movement of ear 60 is limited to the area between the distal end 112 of leg 103 and end 64 of slot 61. Thus, with the retractor in the position illustrated in FIG. 14, web may be retracted thereby causing the spool to rotate in a clockwise direction as viewed in FIG. 14 positioning ear 60 adjacent slot end 64 as depicted in FIG. 15 while simultaneously pawl 48 rides upwardly out of notch 54 via ramp surface 56 and past contact area 57 onto outer surface 68. Continued web may be retracted; however, the positioning of cam plate 53 is fixed since ear 60 contacts slot end 64. Thus, the first contact area 58 located immediately adjacent locking surface 55 and notch 54 is prevented from contacting pawl 48. Web extension will rotate cam plate 53 in a counterclockwise direction as viewed in FIG. 15 until eventually pawl 48 drops back into notch 54 and locks with teeth 111. With the pawl locked to the teeth, ear 60 is located adjacent distal end 112 of leg 103 thereby preventing movement of ear 60 to end 75 while simultaneously spacing apart first contact area 58 from pawl 48.

Thus, the initial contact area 58 is first movable adjacent pawl 48 to keep the pawl apart from the spool teeth as the web is initially extended to the web maximum extended position of FIG. 13. Spring 105 moves cam release 101 to extend toward ear 60 of the cam plate to limit movement of the initial contact area 58 against pawl 48 once the spool is at the web maximum extended position of FIG. 13 and then moved in the retracting direction between the maximum web extended position and the web retracted position allowing the pawl to lockingly engage the teeth limiting web extension as illustrated in FIG. 14. Leg 103 located adjacent the cam plate limits movement of the initial contact area 58 toward pawl 48 when the spool is in the web extended position of FIG. 14. The cam release extends across the spool parallel to axis 45 and to the cross member 102. Member 102 is sufficiently adjacent cam release 101 so that leg 104 will contact member 102 thereby limiting the maximum counterclockwise rotation of the cam release as viewed in FIG. 12.

An alternate embodiment of cam plate 53 is shown in FIG. 16. Cam plate 115 is identical to cam plate 53 except for the presence of a relief or indented portion 119 of constant radius 116 extending from end 118 of area 58 to end 117 of area 57. Radius 116 is less than the radius 59 of areas 57 or 58. Cam plate 115 operates in a manner identical to the operation of plate 53 with indented portion insuring proper clearance between the plate and the retractor housing.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A retractor with cam release comprising:
   a frame;
   a spool rotatably mounted to said frame about an axis and having an end wall with a plurality of outwardly extending teeth thereon;
   a web wound on said spool;
   first spring means connected to said frame and said spool operable to bias said spool to a web retracted position but yieldable to allow said spool to rotate to a web extended position;
   a pawl movably mounted to said frame and lockingly engagable with said teeth;
   a cam plate movably mounted on said frame and positioned adjacent said end wall, said cam plate including a cam surface with an initial contact area movable adjacent said pawl to keep said pawl apart from said teeth as said web is initially extended to said web extended position;

bias means on said frame operable to bias said cam plate to rotate with said spool about said axis but yieldable to allow said cam plate to remain stationary while said spool rotates;

a release device movably mounted on said frame and engagable with said cam plate; and, second spring means on said frame operable to bias said pawl into locking engagement with said teeth limiting rotation of said spool when said spool is in said web extended position and also to bias said release device when said spool is in said web extended position to block movement of said initial contact area against said pawl allowing said pawl to lockingly engage said teeth but yieldable to allow said pawl to move apart from said cam plate when said spool is in said web retracted position.

2. The retractor of claim 1 wherein:

said second spring means includes a first spring connected to said frame and said pawl to bias said pawl into locking engagement with said teeth and a second spring connected to said frame and said release device to bias said release device blocking said cam plate.

3. The retractor of claim 1 wherein:

said second spring means moves said release device to extend toward said cam plate limiting movement of said initial contact area against said pawl once said spool is at said web extended position and then moved between said web extended position and said web retracted position allowing said pawl to lockingly engage said teeth limiting web extension.

4. The retractor of claim 3 wherein:

said release device includes a first projection extending adjacent said cam plate limiting movement of said initial contact area toward said pawl when said spool is in said web extended position and a second projection extending toward said web and contacting said web when said spool is in said web retracted position forcing said first projection apart from said cam plate.

5. The retractor of claim 4 wherein:

said release device includes an elongated main body extending across said spool parallel to said axis.

6. The retractor of claim 5 wherein:

said frame includes frame walls at least one of which has an arcuate slot with a first end and an opposite second end and positioned around said axis with said cam plate including a follower extending into said slot limiting pivotal movement of said cam plate about said axis between said first end and said second opposite end of said slot, said first end of said slot located on said frame to allow said initial contact area to contact said pawl when said follower is at said first end; and, said first projection extending against said follower blocking movement of said follower to said first end of said slot when said spool is in said web extended position.

7. The retractor of claim 6 wherein:

said release device and said pawl are both elongated extending between and mounted to said frame walls.

8. A retractor comprising:

a frame;

a spool to receive a web wound thereon with said spool rotatably mounted to said frame about an axis and having an end wall with a plurality of outwardly extending teeth thereon;

a first spring connected to said frame and said spool operable to bias said spool to a web retracted position but yieldable to allow said spool to rotate to a web extended position;

a pawl movably mounted to said frame and lockingly engagable with said teeth;

a cam plate movably mounted on said frame and positioned adjacent said end wall, said cam plate including a cam surface with an initial contact area movable adjacent said pawl to keep said pawl apart from said teeth as said web is initially extended to said web extended position;

a second spring on said frame operable to bias said cam plate to rotate with said spool about said axis but yieldable to allow said cam plate to remain stationary while said spool rotates;

a release device movably mounted on said frame and engagable with said cam plate;

a third spring on said frame operable to bias said pawl into locking engagement with said teeth limiting rotation of said spool when said spool is in said web extended position; and, a fourth spring on said frame operable to bias said release device when said spool is in said web extended position to block movement of said initial contact area against said pawl allowing said pawl to lockingly engage said teeth.

9. The retractor of claim 8 wherein:

said frame includes frame walls at least one of which has an arcuate slot with a first end and an opposite second end and positioned around said axis with said cam plate including a follower extending into said slot limiting pivotal movement of said cam plate about said axis between said first end and said second opposite end of said slot, said first end of said slot located on said frame to allow said initial contact area to contact said pawl when said follower is at said first end.

10. The retractor of claim 9 wherein:

said release device includes a first projection extending adjacent said cam plate limiting movement of said initial contact area toward said pawl when said spool is in said web extended position and a second projection extending toward said web and contacting said web when said spool is in said web retracted position forcing said first projection apart from said cam plate.

11. The retractor of claim 8 wherein:

said release device extends toward said cam plate limiting movement of said initial contact area against said pawl once said spool is at said web extended position and then moves between said web extended position and said web retracted position allowing said pawl to lockingly engage said teeth limiting web extension.

12. A web retractor comprising:

a retractor frame with a pair of upstanding walls;

a web spool rotatably mounted about an axis of rotation to said pair of upstanding walls and movable to and between a web retracted position and a web extended position, said spool including at least one spool end wall with teeth formed circumferentially thereon;

a lock movably mounted to said frame and lockingly engagable with said teeth;

a first device movably mounted on said frame and movable from a first position blocking said lock and teeth from locking together as said spool is moving toward said web extended position to a second position allowing said lock to lock with said teeth as said lock moves from said web extended position; and, a second device mounted on said frame and movable between a third position and a fourth position, said second device when in said third position blocking movement of said first device to said first position and when in said fourth position allowing movement of said first device to said first position.

13. The retractor of claim 12 wherein:

said first device includes a cam surface with an initial contact area in contact with said lock when said first device is in said first position.

14. The retractor of claim 12 wherein:

said second device includes an arm contactable with said first device limiting movement of said first device.

15. The retractor of claim 12 and further comprising:

first spring means on said frame normally biasing said first device against said spool end wall to move therewith but yieldable to allow relative motion therebetween; and, second spring means on said frame normally biasing said spool to said web retracted position but yieldable to allow said spool to move to said web extended position.

16. The retractor of claim 15 and further comprising:

third spring means on said frame normally biasing said lock toward said teeth but yieldable to allow movement of said lock away from said teeth; and, fourth spring means on said frame normally biasing said second device to block said first device.

17. The retractor of claim 13 wherein:

said first device is a cam plate with an upraised cam surface with said initial contact area contactable against said lock, said plate includes a notch adjacent said initial contact area to allow said lock to move toward said teeth.

18. The retractor of claim 17 wherein:

said second device is an elongated member pivotally mounted to said upstanding walls and including a first leg extending toward said spool to engage said web when in said web retracted position and further including a second leg extending adjacent said cam plate to engage same.

19. The retractor of claim 18 wherein:

one of said upstanding walls includes an arcuate slot; and, said cam plate includes an arm extending into said slot limiting movement of said plate between opposite extremes of said slot with said second leg of said elongated member contacting said arm limiting movement of said initial contact area toward said lock.

* * * * *